United States Patent
Smith et al.

(10) Patent No.: US 9,290,036 B2
(45) Date of Patent: Mar. 22, 2016

(54) ROLLER BALL PEN FOR USE WITH METALLIC INKS

(71) Applicant: Crayola LLC, Easton, PA (US)

(72) Inventors: Linda J. Smith, Freemansburg, PA (US); Luis Rodrigo Pineiro, Bethlehem, PA (US)

(73) Assignee: CRAYOLA LLC, Easton, PA (US)

( * ) Notice: Subject to any disclaimer, the term of this patent is extended or adjusted under 35 U.S.C. 154(b) by 32 days.

(21) Appl. No.: 14/211,834

(22) Filed: Mar. 14, 2014

(65) Prior Publication Data

US 2014/0270900 A1    Sep. 18, 2014

Related U.S. Application Data

(60) Provisional application No. 61/783,462, filed on Mar. 14, 2013.

(51) Int. Cl.
| | |
|---|---|
| B43K 7/01 | (2006.01) |
| B43K 7/10 | (2006.01) |
| B43K 15/00 | (2006.01) |
| B43K 11/00 | (2006.01) |
| C09D 11/18 | (2006.01) |

(52) U.S. Cl.
CPC ... *B43K 7/10* (2013.01); *B43K 7/01* (2013.01); *B43K 11/00* (2013.01); *B43K 15/00* (2013.01); *C09D 11/18* (2013.01); *B43K 7/105* (2013.01); *Y10T 29/49885* (2015.01)

(58) Field of Classification Search
CPC ............ B43K 7/01; B43K 7/10; B43K 7/105
USPC .................................. 401/199, 209
See application file for complete search history.

(56) References Cited

U.S. PATENT DOCUMENTS

| | | | |
|---|---|---|---|
| 3,901,608 A | 8/1975 | Phillips | |
| 3,966,336 A | 6/1976 | Lotfallah | |
| 4,669,906 A * | 6/1987 | Narushima et al. | 401/209 |
| 4,952,089 A * | 8/1990 | Schneider | 401/216 |
| 5,000,605 A * | 3/1991 | Schneider | 401/209 |
| 5,700,534 A | 12/1997 | Shibazaki et al. | |
| 6,056,463 A * | 5/2000 | Nishio et al. | 401/47 |
| 6,267,523 B1 | 7/2001 | Poels et al. | |
| 6,283,662 B1 * | 9/2001 | Inoue et al. | 401/216 |
| 6,422,776 B1 | 7/2002 | Nakatani | |
| 7,364,614 B2 | 4/2008 | Kwan et al. | |
| 8,303,206 B2 | 11/2012 | Yoshikawa | |
| 8,348,540 B2 * | 1/2013 | Bedhome et al. | 401/199 |
| 8,376,644 B2 * | 2/2013 | Schwarz et al. | 401/199 |
| 2003/0129015 A1 * | 7/2003 | Sexton | 401/199 |
| 2008/0196622 A1 | 8/2008 | Zhu | |
| 2009/0025602 A1 | 1/2009 | Kwan et al. | |

* cited by examiner

*Primary Examiner* — Kevin P Shaver
*Assistant Examiner* — Joshua Wiljanen
(74) *Attorney, Agent, or Firm* — Shook, Hardy & Bacon L.L.P.

(57) ABSTRACT

A roller ball pen for use with metallic inks, and a method for assembling the roller ball pen for use with metallic inks, is described herein. The pen body includes a housing that encloses a reservoir, a collet, a feed rod, and a tip. The feed rod transfers ink from the reservoir to a roller ball tip at a tapered end of the pen housing. In embodiments, the feed rod is embedded at a threshold distance inside the reservoir to provide an increased surface area for transfer of a metallic ink suspension. In further embodiments, a method of assembling the roller ball pen includes saturation of the reservoir with a metallic ink based on inserting a particular injection needle at a particular depth inside the reservoir.

15 Claims, 1 Drawing Sheet

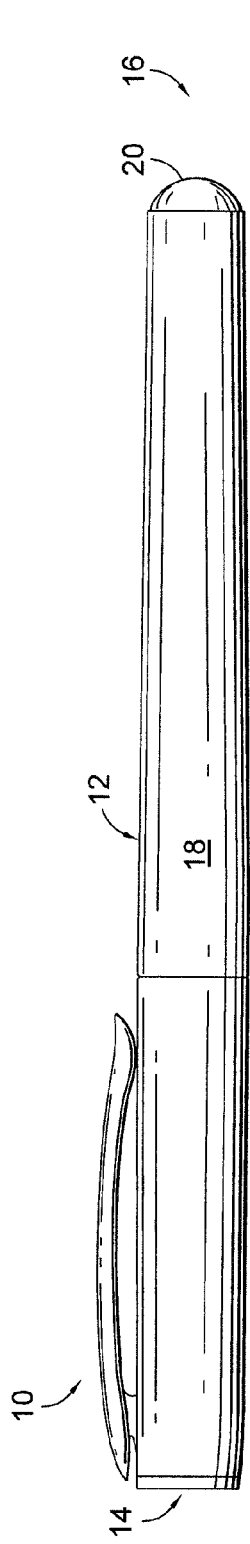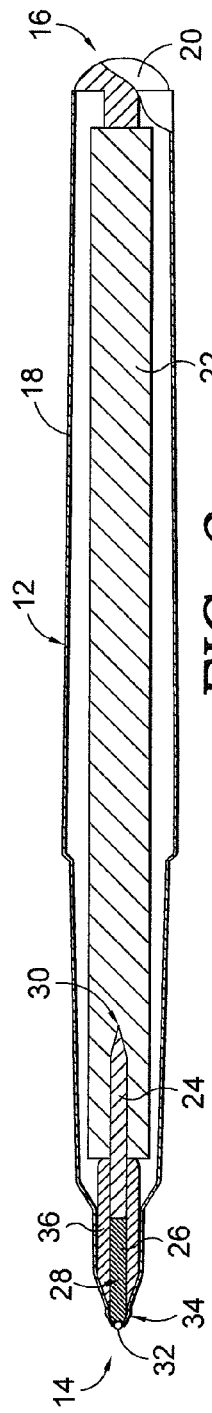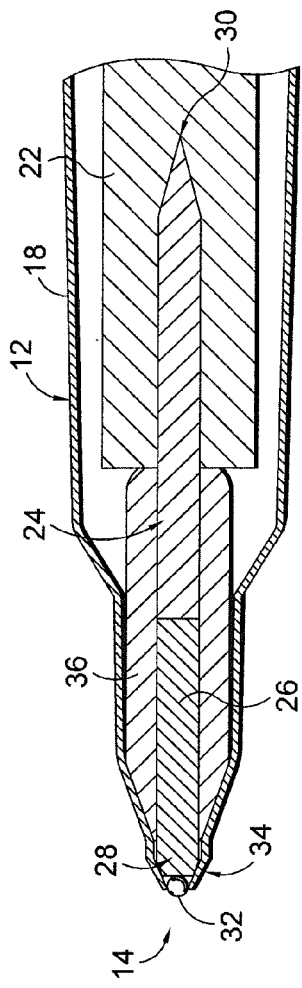

ROLLER BALL PEN FOR USE WITH METALLIC INKS

CROSS-REFERENCE TO RELATED APPLICATIONS

This application claims priority to U.S. Provisional Application Ser. No. 61/783,462, filed Mar. 14, 2013, entitled "Roller Ball Pen for Use with Metallic Inks," the disclosure of which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description below. This summary is not intended to identify key features or essential features of the claimed subject matter, nor is it intended to be used as an aid in isolation to determine the scope of the claimed subject matter. In brief and at a high level, this disclosure describes, among other things, a roller-ball pen for use with metallic inks. In embodiments, the pen body includes a housing that encloses a reservoir, a collet, and a feed rod that transfers ink from the reservoir to a roller ball tip at a tapered end of the pen housing.

DESCRIPTION OF THE DRAWINGS

Illustrative embodiments of the invention are described in detail below with reference to the attached drawing figures, and wherein:

FIG. 1 is a side view of a pen in a closed position, with a cap coupled to the front end of the pen body, in accordance with an embodiment of the invention;

FIG. 2 is a cross-sectional, side view of the pen of FIG. 1 in an open position, in accordance with an embodiment of the invention; and FIG. 3 is an enlarged, cross-sectional view of the pen of FIG. 2, in accordance with an embodiment of the invention.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

In traditional ink-delivery systems, a highly-porous, fibrous nib is typically used for dispensing a metallic ink from a pen. Additionally, a typical metallic marker has a nib that contacts only a small portion of an ink-storing reservoir, providing ink transport at the root of the nib. Accordingly, where ink enters the nib, transport of metallic particles may be problematic, causing settling of particulates where the ink is transferred and clogging of the nib. As such, embodiments of the present invention employ a roller ball tipped pen for marking with a metallic ink on a surface. Many different configurations of roller ball tipped pens may be provided for transferring ink from an ink-storing reservoir onto a writing surface. Accordingly, the particular mechanism of fluid transfer using a roller-ball pen will not be described herein.

Embodiments of the invention include an ink delivery system where an ink suspension of metallic particles passes from a reservoir of metallic ink, through a feed rod, through a collet, and out through a roller ball tip of a pen. The tip of the feed rod may directly contact the reservoir, and in some embodiments, is submerged within the reservoir at a particular depth to provide an increased surface area for fluid (i.e. metallic ink) transfer. As such, in some embodiments, the system transports a suspension of metallic particles of a particular size from the reservoir, through the feed rod, and into the roller ball tip of the pen.

Accordingly, in one embodiment, the present invention is directed to a roller ball pen device for use with metallic inks. The roller ball pen device may include a housing and a reservoir enclosed by the housing, where the reservoir is saturated with a metallic ink. Additionally, the roller ball pen device may include a tapered tip that is coupled to a first end of the pen body and that includes a roller ball. The roller ball pen device may also include a feed rod that is adjacent the tapered tip and that is configured to transfer a first amount of the metallic ink from the reservoir to the roller ball. In embodiments, a first end of the feed rod is disposed at a first end of the housing and a second end of the feed rod is disposed at a threshold distance inside the reservoir.

A further embodiment of the present invention provides a method for assembling a roller ball pen device. The method may include providing a pen housing that accepts a roller ball tip at a first end of the pen housing and accepts a reservoir at a second end of the pen housing. Embodiments of the method further include positioning a feed rod adjacent the roller ball tip, and embedding at least a portion of the feed rod at a distance inside the reservoir such that a surface area of the feed rod embedded in the reservoir accepts a threshold amount of metallic ink. Additionally, the method may include injecting an amount of metallic ink into the reservoir at a first distance inside the reservoir such that an amount of pooled metallic particles is reduced relative to injection of an amount of metallic ink at a second distance inside the reservoir.

Additionally, another embodiment of the present invention provides a pen apparatus. The pen apparatus includes a housing, a reservoir enclosed by the housing, where the reservoir is saturated with a metallic ink, and a tapered tip that includes a roller ball. The pen apparatus may further include a feed rod configured to transfer an amount of metallic ink from the reservoir to the roller ball, wherein the amount of metallic ink transferred from the reservoir to the roller ball is increased based on the feed rod being disposed at or above the threshold distance inside the reservoir.

With reference now to the figures, apparatus, methods, and systems for providing a roller ball pen for use with metallic inks are described in accordance with embodiments of the invention. Various embodiments are described with respect to the figures in which like elements are depicted with like reference numerals.

As depicted in FIGS. 1-3, embodiments of the invention include a marking device 10 that includes a pen body 12 having a first end 14 and a second end 16. In FIG. 1, for example, the pen body 12 includes a housing 18, which is positioned along a central, longitudinal axis, and which accepts the internal components of the marking device 10. As in FIG. 1, the pen body 12 may further include an end cap 20 near the second end 16. As shown in the cross-section of FIGS. 2-3, the housing 18 may include a reservoir 22 having a feed rod 24 inserted at a distance inside the reservoir 22. As discussed below, in some embodiments of the invention, a second end 30 of the feed rod 24 is inserted at a depth inside the reservoir 22, which allows for a transfer of a threshold amount of metallic ink from the reservoir 22 to a marking surface. Feed rod 24 further includes, in some embodiments, a covering 26 over a first end 28 of the feed rod 24. In some embodiments, the covering 26 is a plastic covering.

Roller ball 32 may be held in position by the tapered tip 34 of the housing 18. In embodiments, a collet 36 is adjacent to the tapered tip 34 and the first end 28 of the feed rod 24. In further embodiments, the collet 36 secures the tapered tip 34 of the pen at the first end 14 of the housing 18. Additionally, different configurations of a pen tip may be coupled to the housing 18. As such, in one example, the collet 36 is a transitional piece that enables the housing 18 to couple to different tips other than the tapered tip 34 of the marking device 10. In one embodiment, the tapered tip 34 secures the roller ball 32 to provide a consistent transfer of metallic ink from the reservoir 22, through the feed rod 24, and out of the roller ball 32 of the tapered tip 34, as secured by the collet 36. As such, in embodiments, the feed rod 24 is adjacent to the roller ball 32, and is submerged inside the reservoir 22.

The metallic ink used in embodiments of the invention may be any metallic ink known in the art, such as a metallic ink having a viscosity between about 1.0 centipoise (cps) and about 50.0 cps. In some embodiments, a range of viscosity of the metallic ink is between about 1.0 cps and about 15.0 cps, and in further embodiments, the range of viscosity is between about 6.0 cps and about 12.0 cps. Embodiments of the invention use a water-based metallic ink. In some embodiments, the metallic ink may include an aluminum/metallic flake, dispersants, surfactants, stabilizers, pigments, and/or dyes as part of the ink suspension. The pigment and/or dye may impart color to the ink suspension in addition to a coloration provided by the metallic flake. An amount of metal particulates, such as aluminum/metallic flakes, may settle and/or precipitate out from a low-viscosity metallic ink used in the reservoir 22 of the marking device 10. As such, in embodiments of the invention, the feed rod 24 may be inserted into the reservoir 22 at a particular depth to facilitate the transportation of the ink through the surface of the feed rod 24 in contact with the reservoir 22, including the second end 30 of the feed rod 24. In one example, because the feed rod 24 is inserted at a depth inside the reservoir 22, the amount of metallic ink transported from the reservoir 22, through the feed rod 24, and into the roller ball 32 of the tapered tip 34 is increased relative to the amount of metallic ink transported from a feed rod that only contacts a reservoir at the tip (such as, for example, if only the second end 30 of the feed rod 24 contacted the reservoir 22). In other words, the increased amount of surface area of the feed rod 24 that contacts the reservoir 22 provides for increased transmission of metallic ink, despite the settling of metallic particles, as is inherent to the properties of low-viscosity metallic inks.

In embodiments of the invention, as metallic particles settle from the ink stored in the reservoir 22, including particulates settling towards the front of the reservoir 22 adjacent the collet 36, the increased surface area of the feed rod 24 submerged inside reservoir 22 provides for the continued flow of ink from the marking device 10, despite the feed rod 24 beginning to become partially clogged with metallic particles. For example, settling near a front end of the reservoir 22, such as near the first end 14 of the marking device 10, is compensated for based on the length of the feed rod 24 submerged in the reservoir 22 that facilitates an increased transmission of ink.

During assembly of the marking device 10, the reservoir 22 may be fully saturated with a metallic ink injected into the reservoir 22 using a particular needle. Accordingly, the marking device 10 may be assembled by inserting the reservoir 22 into the second end 16 of the pen body 12, and further inserting an ink-injection needle through the second end 16 to saturate the reservoir 22, while the tip (such as the tapered tip 34) and a pen cap are coupled near the first end 14 of the pen body 12. In one embodiment, the needle has a particular tip configuration and/or geometry for saturation of reservoir 22. For example, the ink-injection needle used to saturate reservoir 22 may dispense ink at a 90-degree angle relative to the body of the ink-injection needle through, for instance, one or more orifices that are perpendicular to the ink-injection needle body, while blocking the flow of ink out of the tip edge of the needle (i.e. blocking traditional dispensing of ink from the needle tip). In further embodiments, the ink-injection needle is inserted at a particular depth inside the reservoir 22 for complete saturation. For example, the ink-injection needle may be inserted proximate to the front end of the reservoir 22, closest to the first end 14 of the pen body 12. In dispensing ink near the front end of the reservoir 22, a longer ink-injection needle may be used and/or the travel of the ink injection-needle itself may be adjusted to reach a dispensing area closer to the front tip of the reservoir 22 (near the first end 14 of the pen body 12).

Embodiments of the invention include a marking device 10 that satisfies one or more specifications and/or thresholds for continuous writing. In other words, embodiments of the invention include a threshold requirement for a linear distance for which the marking device 10 consistently transfers metallic ink. In one embodiment, a threshold requirement for marking by the marking device 10 is a write-out distance of about 200 feet or greater. As such, an acceptable level of efficiency of the marking device 10 may be determined based on satisfying a threshold requirement for marking with a metallic ink. In one example, a threshold requirement for marking with the marking device 10 is a minimum write-out distance of 200 feet.

In embodiments of the invention, adjustments may be made to the marking device 10 based on transferring a metallic ink having a particular viscosity and/or metallic particle size. For example, in one embodiment, the density of the reservoir 22 may be increased or decreased based on a metallic ink suspension having a low viscosity. In other embodiments, one or more features of the feed rod 24 may be altered, such as the material or the porosity of the feed rod 24. The size of roller ball 32 may also be increased, to provide a more efficient delivery of ink from the marking device 10. In further embodiments, channeling associated with the tapered tip 34 that provides spacing and/or allows ink to flow through the pen body 12 may be altered in design, tapering configuration, and/or geometry to adjust the rate at which ink approaches the roller ball 32.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A roller ball pen device for use with metallic inks comprising:
   a pen body including a housing;
   a reservoir enclosed by the housing, wherein the reservoir is saturated with a metallic ink having a viscosity that is in a range between 1.0 cps and 50.0 cps;
   a tapered tip coupled to a first end of the pen body, the tapered tip comprising a roller ball; and
   a feed rod adjacent to the tapered tip, the feed rod configured to transfer a first amount of the metallic ink from the reservoir to the roller ball, wherein a first end of the feed rod is disposed at a first end of the housing, and further wherein a second end of the feed rod is disposed at a first threshold distance inside the reservoir.

2. The roller ball pen device of claim 1, further comprising:
   a plastic covering over the first end of the feed rod.

3. The roller ball pen device of claim 1, wherein the tapered tip is tapered to a point at which the roller ball is positioned.

4. The roller ball pen device of claim 1, wherein the housing accepts the tapered tip at the first end of the housing and accepts the reservoir at a second end of the housing.

5. The roller ball pen device of claim 1, wherein the reservoir is saturated with the metallic ink based on injecting a second amount of the metallic ink into the reservoir at a second threshold distance inside the reservoir.

6. The roller ball pen device of claim 5, wherein injecting the second amount of the metallic ink into the reservoir at the second threshold distance inside the reservoir comprises tangentially injecting the second amount of the metallic ink, the metallic ink having a low viscosity.

7. The roller ball pen device of claim 6, wherein marking by the roller ball pen device generates an effective line length equal to or greater than 200 feet.

8. The roller ball pen device of claim 1, further comprising a collet coupled to the tapered tip and the housing.

9. The roller ball pen device of claim 8, wherein the collet secures at least a portion of the feed rod, such that the feed rod is disposed at the first threshold distance inside the reservoir.

10. The roller ball pen device of claim 1, wherein the first amount of the metallic ink transferred is increased relative to a second amount of metallic ink transferred from the reservoir to the roller ball when the feed rod is disposed inside the reservoir at a distance below the first threshold distance.

11. A pen apparatus comprising:
    a housing;
    a reservoir enclosed by the housing, wherein the reservoir is saturated with a metallic ink having a viscosity that is in a range between 1.0 cps and 50.0 cps;
    a tip comprising a roller ball; and
    a feed rod configured to transfer an amount of metallic ink from the reservoir to the roller ball, wherein the amount of metallic ink transferred from the reservoir to the roller ball is increased based on the feed rod being disposed at or above a threshold distance inside the reservoir.

12. The pen apparatus of claim 11, further comprising a covering over a first end of the feed rod.

13. The pen apparatus of claim 12, wherein the covering comprises a plastic covering.

14. The pen apparatus of claim 11, wherein the tip comprises a tapered tip coupled to the housing by a collet.

15. The pen apparatus of claim 11, wherein a collet secures at least a portion of the feed rod such that the feed rod is disposed at or above the threshold distance inside the reservoir.

* * * * *